(12) United States Patent
Youssef

(10) Patent No.: US 12,283,877 B2
(45) Date of Patent: Apr. 22, 2025

(54) SYNCHRONOUS RECTIFICATION

(71) Applicant: Marotta Controls, Inc., Montville, NJ (US)

(72) Inventor: Joseph Fayez Youssef, Bridgewater, NJ (US)

(73) Assignee: Marotta Controls, Inc., Montville, NJ (US)

( * ) Notice: Subject to any disclaimer, the term of this patent is extended or adjusted under 35 U.S.C. 154(b) by 301 days.

(21) Appl. No.: 17/957,029

(22) Filed: Sep. 30, 2022

(65) Prior Publication Data

US 2024/0113610 A1    Apr. 4, 2024

(51) Int. Cl.
*H02M 3/335* (2006.01)
*H02M 1/00* (2006.01)

(52) U.S. Cl.
CPC ..... *H02M 1/0009* (2021.05); *H02M 3/33592* (2013.01)

(58) Field of Classification Search
CPC .......... H02M 1/0009; H02M 3/33592
See application file for complete search history.

(56) References Cited

U.S. PATENT DOCUMENTS

| | | | | |
|---|---|---|---|---|
| 5,278,748 A | * | 1/1994 | Kitajima | H02M 3/33592 363/21.02 |
| 5,689,409 A | * | 11/1997 | Scharlach | H02M 1/34 363/21.04 |
| 2003/0193820 A1 | * | 10/2003 | Nakayama | H02M 3/33592 363/21.14 |
| 2006/0109693 A1 | * | 5/2006 | Kyono | H02M 3/33592 363/21.01 |
| 2007/0070657 A1 | * | 3/2007 | Kyono | H02M 3/33592 363/125 |
| 2018/0062530 A1 | * | 3/2018 | Kong | H02M 1/08 |

* cited by examiner

*Primary Examiner* — Kyle J Moody
(74) *Attorney, Agent, or Firm* — Lerner David LLP

(57) ABSTRACT

A system for detecting current through a secondary winding of a switching voltage regulator without directly sensing the current through the secondary winding of the switching voltage regulator, the system including a diode; an inductor connected in series with the diode to form a current detection path, wherein the current detection path is connected in parallel with the secondary winding; a switching element connected in series with the current detection path and the secondary winding; and a controller operable to sense a voltage drop between a first terminal of the switching element and a second terminal of the diode, the voltage drop being indicative of the current through the secondary winding.

11 Claims, 4 Drawing Sheets

SYNCHRONOUS RECTIFICATION

BACKGROUND

Switching voltage regulators may employ rectification to provide a direct current (DC) output voltage. For example, switching voltage regulators of the flyback converter type may employ a diode in series with the secondary winding of a transformer to provide DC voltage to a load. To illustrate, reference is made to FIG. 1.

FIG. 1 is a circuit diagram of a switching voltage regulator 100 of the flyback type that uses a diode 105 in series with a secondary winding 110 of a transformer 115 to convert a DC voltage from a voltage source 120 to a DC voltage supplied to a load 125. In the FIG. 1 configuration, the switching is performed by a metal-oxide-semiconductor field effect transistor (MOSFET) 130. When MOSFET 130 has been set to an on state, such that the current though a primary winding 135 of the transformer 115 is stable, and is then switched to an off state, the switching gives rise to a voltage across the primary winding 135, as indicated in the figure by "Vlp." The voltage Vlp, in turn, gives rise to a voltage across the secondary winding 110, as indicated in the figure as "Vls." The polarity of the voltage Vls is opposite that of voltage Vlp because the primary winding 135 and secondary winding 110 are coupled in an inverted fashion. Accordingly, current flows through the secondary winding 110 and diode 105 as depicted by arrows 140. As also depicted by the arrows 140, when the MOSFET 130 is switched to the off state, charge may flow into a decoupling capacitor 145 that is provided between the load 125 and the voltage regulator 100. The energy stored in the transformer 115 during the MOSFET 130 on-time is transferred to the decoupling capacitor 145 and load 125 during the MOSFET 130 off-time.

BRIEF SUMMARY

To improve the power delivery efficiency of switching voltage regulators, the present technology is provided.

In one aspect, the present technology provides a system for detecting current through a secondary winding of a switching voltage regulator without directly sensing the current through the secondary winding of the switching voltage regulator, the system including a diode; an inductor connected in series with the diode to form a current detection path, wherein the current detection path is connected in parallel with the secondary winding; a switching element connected in series with the current detection path and the secondary winding; and a controller operable to sense a voltage drop between a first terminal of the switching element and a second terminal of the diode, the voltage drop being indicative of the current through the secondary winding.

In another aspect the present technology provides a voltage regulator including a voltage source; a transformer having a primary winding and a secondary winding; a first switching element connected in series with the voltage source and the primary winding; a diode; an inductor connected in series with the diode to form a current detection path, wherein the current detection path is connected in parallel with the secondary winding; a second switching element connected in series with the current detection path and the secondary winding; and a controller operable to sense a voltage drop between a first terminal of the second switching element and a second terminal of the diode, the voltage drop being indicative of the current through the secondary winding.

BRIEF DESCRIPTION OF THE DRAWINGS

The accompanying drawings are not intended to be drawn to scale. Also, for purposes of clarity not every component may be labeled in every drawing. In the drawings.

DETAILED DESCRIPTION

Examples of systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
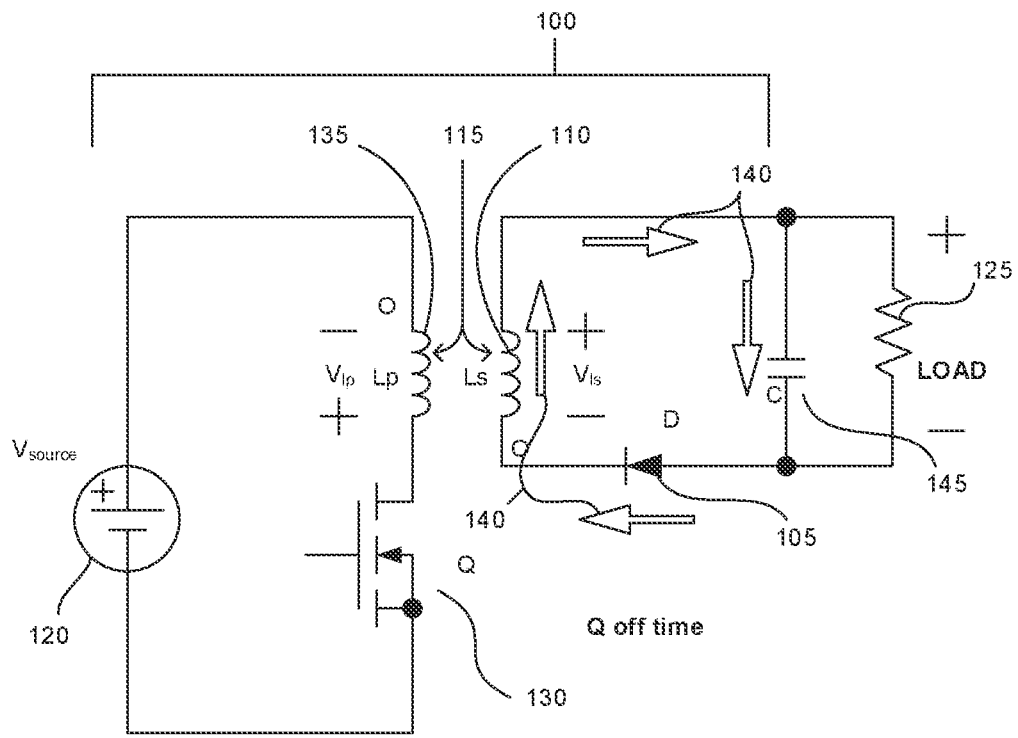
FIG. 1 is a circuit diagram of a switching voltage regulator of the flyback type that uses a diode in series with a secondary winding of a transformer to convert a DC voltage from a voltage source to a DC voltage supplied to a load.

It has been recognized that the efficiency of switching voltage regulators such as that of FIG. 1 can be improved by replacing the diode with a transistor. For example, the efficiency of voltage regulator 100 may be improved by replacing diode 105 with a MOSFET. A MOSFET can have a resistance in the on state that is much lower than the resistance of a diode in the on state, and therefore power loss across the MOSFET when in the on state is much less than power loss across the diode when in the on state. To illustrate, reference is made to FIGS. 2A and 2B.

Figure 2A:
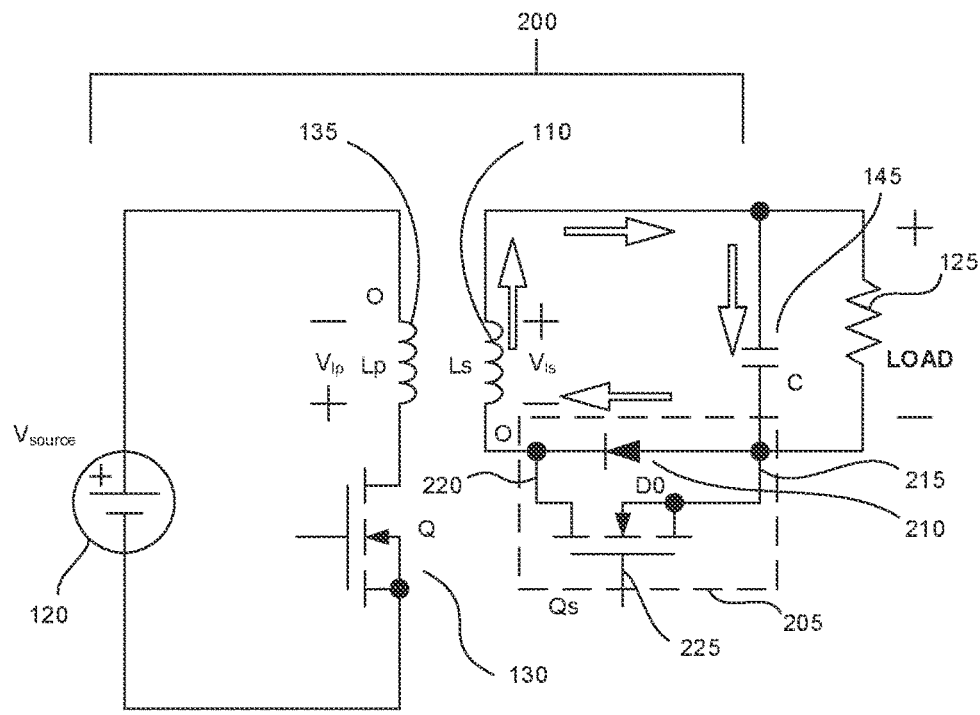
FIG. 2A is a circuit diagram of a switching voltage regulator that is the same as the voltage regulator of FIG. 1 except for the substitution of a secondary-side MOSFET for the diode.

FIG. 2A is a circuit diagram of a switching voltage regulator 200 that is the same as the voltage regulator 100 of FIG. 1 except for the substitution of a secondary-side MOSFET 205 for diode 105. The MOSFET includes a body diode 210, a source terminal 215, a drain terminal 220, and a gate terminal 225. In the FIG. 2A configuration, when the switching off of MOSFET 130 gives rise to voltage Vls across the secondary winding 110, the MOSFET 205 must be switched to the on state to allow current to flow freely through the MOSFET 205. On the other hand, when MOSFET 130 is to be switched to the on state, and gives rise to a reverse polarity Vls, MOSFET 205 must be in the off state to ensure that a reversed current is not delivered to the load 125, i.e., so that the voltage regulator 200 is performing its rectification function. Moreover, in discontinuous conduction mode (DCM) operation of the voltage regulator 200, the MOSFET 205 must be switched off when the current though through the secondary winding reaches zero in order to maximize efficiency of the voltage regulator 200. Accordingly, in DCM there is a need to turn on the MOSFET 205 when the secondary winding 110 is discharging, and to turn off the MOSFET 205 when the secondary winding 110 is fully discharged. One technique for controlling switching of the MOSFET 205 is shown in FIG. 2B.

Figure 2B:
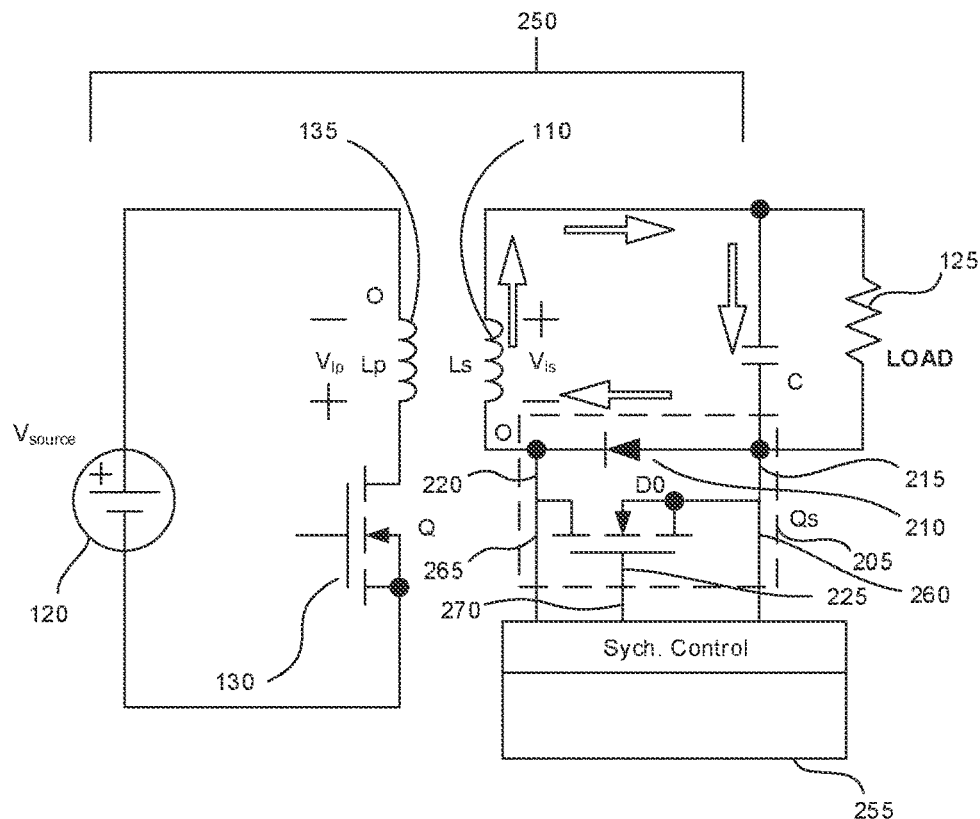
FIG. 2B is a circuit diagram of a switching voltage regulator that is the same as the voltage regulator of FIG. 2A except for the inclusion of a synchronous controller for switching the secondary-side MOSFET.

FIG. 2B is a circuit diagram of a switching voltage regulator 250 that is the same as the voltage regulator 200 of FIG. 2A except for the inclusion of a synchronous controller 255 for switching the MOSFET 205. The synchronous controller 255 has a first sense terminal 260 coupled to the source terminal 215 of the MOSFET 205, a second sense terminal 265 coupled to the drain terminal 220 of the MOSFET 205, and a control terminal 270 coupled to the gate terminal 225 of the MOSFET 205. The synchronous controller 255 is operable to sense a voltage across the source terminal 215 to drain terminal 220 via first sense terminal 260 and second sense terminal 265, and to send a control signal (i.e., a switching signal) to gate terminal 225 via control terminal 270. In the FIG. 2B configuration, when the MOSFET 205 is in the off state and the switching off of MOSFET 130 gives rise to voltage Vls across the secondary winding 110, current begins to flow through the body diode 210 of the MOSFET 205 and the synchronous controller 255 senses a source-to-drain voltage drop (e.g., a 0.7V drop) via the first sense terminal 260 and the second sense terminal 265, the sensed drop being associated with current flowing through the body diode 210. In response to sensing the source-to-drain voltage drop, the synchronous control 255 switches the MOSFET 205 to the on state by sending a turn-on control signal (e.g., 10V) to the gate terminal 225 via the control terminal 270. Then, once the MOSFET 205 is in the on state, the MOSFET 205 conducts with little resistance (the voltage drop in the on state being much lower than the voltage drop across body diode 210 triggering the on state) and the amount of power dissipated by the MOSFET 205-is very small compared to that which would be dissipated by diode 105. Thereby greatly improving the power delivery efficiency of the voltage regulator 250 relative that of voltage regulator 100.

Further, in DCM, when current flowing through the MOSFET 205 reaches zero the MOSFET 205 must be switched off to prepare for reversal of the voltage across the secondary winding 110. Thus, when the synchronous controller 255 detects zero source-to-drain voltage drop across MOSFET 205 it switches off the MOSFET 205 as zero source-to-drain voltage drop across MOSFET 205 indicates that the current flowing through the MOSFET 205 has reached zero. However, in the FIG. 2B configuration, since the on state source-to-drain resistance of the MOSFET 205 is very small (e.g., 1 mohm) the source-to-drain voltage drop is very small even when significant current is flowing through the MOSFET 205, and therefore the source-to-drain voltage drop, and measurement of the source-to-drain voltage drop, are highly sensitive. For example, an interfering signal or noise can distort the source-to-drain voltage drop, or measurement of the source-to-drain voltage drop, such that the drop may appear to be zero when it is not actually zero. In this manner, the synchronous controller 255 may erroneously detect zero source-to-drain voltage drop, and based on such false detection erroneously determine that the current through MOSFET 205 is zero and turn off the MOSFET 205 prematurely. By turning off the MOSFET 205 too early, the current flows in the body diode 210 instead, with increased power dissipation, thereby reducing the power delivery efficiency of voltage regulator 250.

To reduce the likelihood of turning off the MOSFET 205 too early, a voltage regulator including a current detection path is provided.

Figure 3:
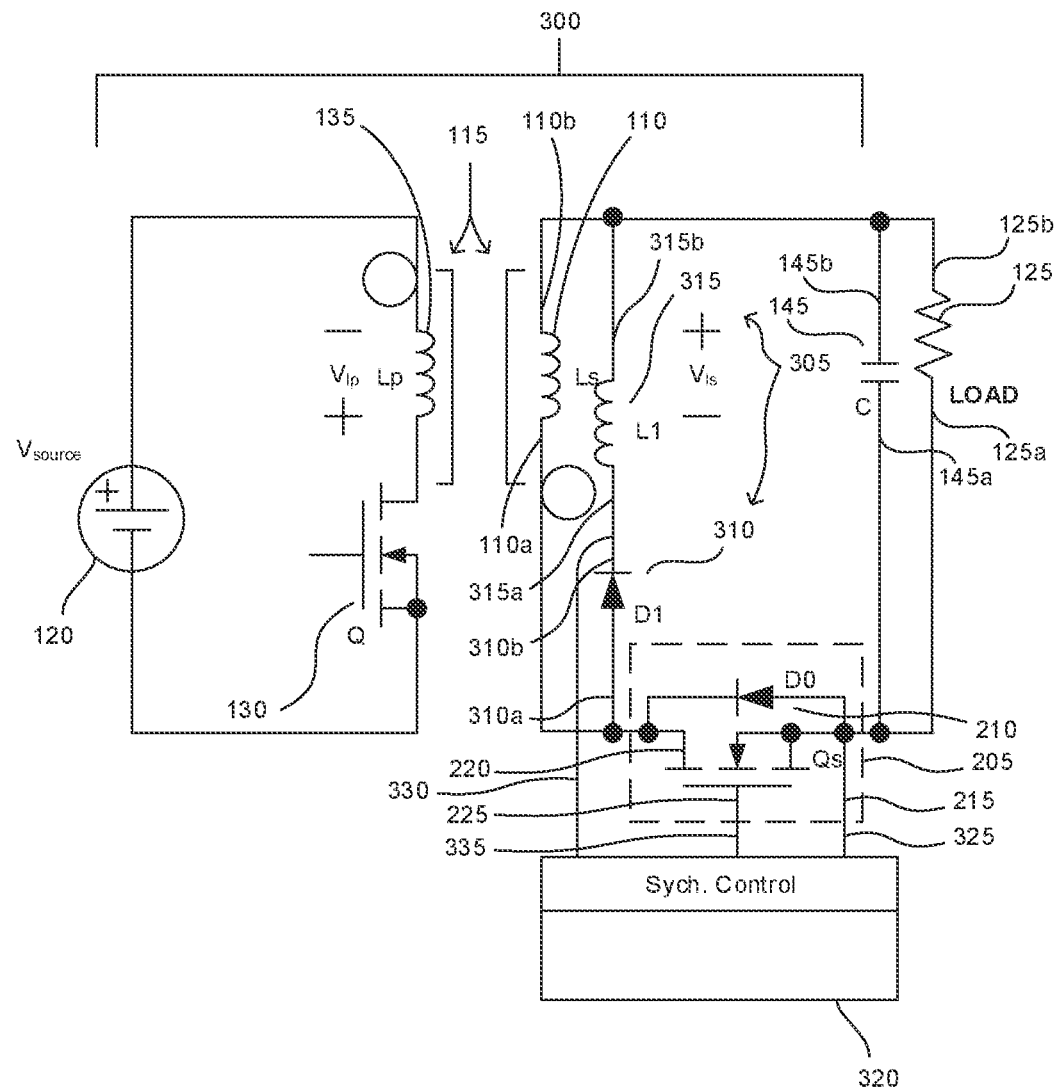
FIG. 3 is a circuit diagram of a switching voltage regulator including a current detection path.

FIG. 3 is a circuit diagram of a switching voltage regulator 300 including a current detection path 305. The current detection path 305 includes a diode 310 and an inductor 315. The diode 310 has an anode terminal 310a and a cathode terminal 310b. The inductor 315 has a first inductor terminal 315a and a second inductor terminal 315b. The anode terminal 310a is coupled to the drain terminal 220 of MOSFET 205 and to a first secondary winding terminal 110a of the secondary winding 110. The cathode terminal 310b and the first inductor terminal 315a are coupled to each other. The second inductor terminal 315b is coupled to a second secondary winding terminal 110b of the secondary winding 110.

The voltage regulator 300 may also include a synchronous controller 320. The synchronous controller 320 has a first sense terminal 325 coupled to the source terminal 215 of the MOSFET 205, a second sense terminal 330 coupled to the cathode terminal 310b, and a control terminal 335 coupled to the gate terminal 225 of the MOSFET 205. Further, the voltage regulator 300 may be coupled to a load, e.g., load 125, by coupling the source terminal 215 of the MOSFET 205 and the first sense terminal 325 of the synchronous controller 320 to a first load terminal 125a of the load 125, and coupling the second secondary winding terminal 110b and the second inductor terminal 315b to a second load terminal 125b of the load 125. Moreover, as an option, the voltage regulator 300 may be used with a decoupling capacitor, e.g., decoupling capacitor 145, by coupling the source terminal 215 of the MOSFET 205 and the first sense terminal 325 of the synchronous controller to a first decoupling capacitor terminal 145a of the decoupling capacitor 145, and coupling the second secondary winding terminal 110b and the second inductor terminal 315b to a second decoupling capacitor terminal 145b of the decoupling capacitor 145. Thus, when the voltage regulator 300 is coupled to the load 125 and the decoupling capacitor 145 is used, the load 125 and decoupling capacitor 145 are coupled in parallel with each other.

It should be noted that the use of a single decoupling capacitor in the configuration of FIG. 3 is merely illustrative. The voltage regulator 300 may be coupled to a load through any number of decoupling capacitors, or through no decoupling capacitor. Further, while the decoupling capacitor 145 is described as an element of the voltage regulator 300, the decoupling capacitor need not be an element of the voltage regulator 300. The decoupling capacitor 145 may be external to the voltage regulator 300.

In any event, the voltage regulator 300 of FIG. 3 provides better power delivery efficiency than the voltage regulators of FIGS. 1, 2A, and 2B. By providing the current detection path 305 and coupling the second sense terminal 330 of synchronous controller 320 to the cathode terminal 310b of diode 310, the voltage regulator 300 is made less sensitive to noise that may cause premature turn off of MOSFET 205. That is, when the switching off of MOSFET 130 gives rise to voltage Vls across the secondary winding 110, current begins to flow through the body diode 210 of MOSFET 205 and the diode 310. As the current increases through the body diode 210 and diode 310, the voltage drop from the source terminal 215 of MOSFET 205 to the cathode terminal 310*b* of diode 310 rises, and when such voltage drop rises to a threshold (e.g., 100 mv), the synchronous controller 320 switches on MOSFET 205. That is, the synchronous controller 320 is monitoring the voltage drop from the source terminal 215 of MOSFET 205 to the cathode terminal 310*b* of diode 310 via first sense terminal 325 and second sense terminal 330, and the synchronous controller 320 is configured to send a turn-on control signal (e.g., 10V) to the gate terminal 225 via the control terminal 335 when the voltage drop from the source terminal 215 of MOSFET 205 to the cathode terminal 310*b* of diode 310 exceeds a threshold value. Further, during the on state of MOSFET 130 the current through the primary winding 135 of the transformer 115 is increasing, as is the current through inductor 315 due to the voltage that appears across the secondary winding 110 when the MOSFET 130 is switched on; however, the current through the primary winding 135 is much higher than current through inductor 315, as the inductor 315 is chosen to have a value many times greater than the inductance of the secondary winding 110, and therefore the voltage appearing across the secondary winding 110 when the MOSFET 130 is switched on has a lower charging rate on the current in inductor 315. In some embodiments, the inductance of inductor 315 is greater than the inductance of the secondary winding 110 by a multiple of in the range of 50 to 1000. For example, the inductor 315 may have an inductance of 900 μH while the secondary winding 110 may have an inductance of 3 μH. During the turn off state of the MOSFET 130, the inductance of the secondary winding 110 discharges to the decoupling capacitor and the load 125, and also the inductor 315 discharges to the decoupling capacitor 145 and the load 125. The current though the secondary winding 110 of transformer 115 and the current through inductor 315 reach zero at the same time. Thus, sensing the voltage drop from the source terminal 215 of MOSFET 205 to the cathode terminal 310*b* of diode 310 provides an accurate indicator of the time at which the current in the secondary winding 110 reaches zero.

Regarding turn-off of the MOSFET 205 in the voltage regulator 300, as the current through the secondary winding 110 dissipates following turn off of MOSFET 130, so does the current in the MOSFET 205 and the current in the current detection path 305. Thus, the voltage drop from the source terminal 215 of MOSFET 205 to the cathode terminal 310*b* of diode 310 drops in turn. Moreover, when the voltage regulator 300 is operating in DCM, the current through the current detection path 305 reaches zero at the same time that the current through the secondary winding 110 reaches zero. When the current through the MOSFET 205 and the current through the current detection path 305 are zero, the MOSFET 205 can be turned off. Accordingly, when the synchronous controller 320 senses a zero voltage drop from the source terminal 215 of MOSFET 205 to the cathode terminal 310*b* via first sense terminal 325 and second sense terminal 330, the synchronous controller 320 sends a turn-off control signal (e.g., 0.0V) to the gate terminal 225 via the control terminal 335. In this manner, the MOSFET 205 is properly switched off to prepare for reversal of the voltage across the secondary winding 110.

Notably, a determination that the current through the secondary winding 110 is zero is based on, not only on the source-to-drain voltage drop across MOSFET 205, but on a cumulative voltage drop that includes the source-to-drain voltage drop across MOSFET 205 and the anode-to-cathode voltage drop across diode 310. Therefore, the determination that the current through the secondary winding 110 is zero is not based solely on a measurement of the voltage drop across the very small on state source-to-drain resistance of the MOSFET 205. Instead, the determination that the current through the secondary winding 110 is zero is based on the sum of the voltage drop across the on state source-to-drain resistance of the MOSFET 205 and the voltage drop across the significantly more appreciable the on state anode-to-cathode resistance of the diode 310. Therefore, since the synchronous controller 320 is monitoring a voltage that is significantly higher than the voltage drop across the MOSFET 205, the FIG. 3 configuration greatly reduces the likelihood that an interfering noise signal will distort the voltage drop sensed by the synchronous controller 320. Thereby, greatly reducing the likelihood that the voltage drop sensed by the synchronous controller 320 will mistakenly appear as zero, and greatly reducing the likelihood of a false detection of zero-current in the secondary winding 110. In this manner, the FIG. 3 configuration improves power delivery efficiency by avoiding premature turn-off of MOSFET 205.

Figure 4:
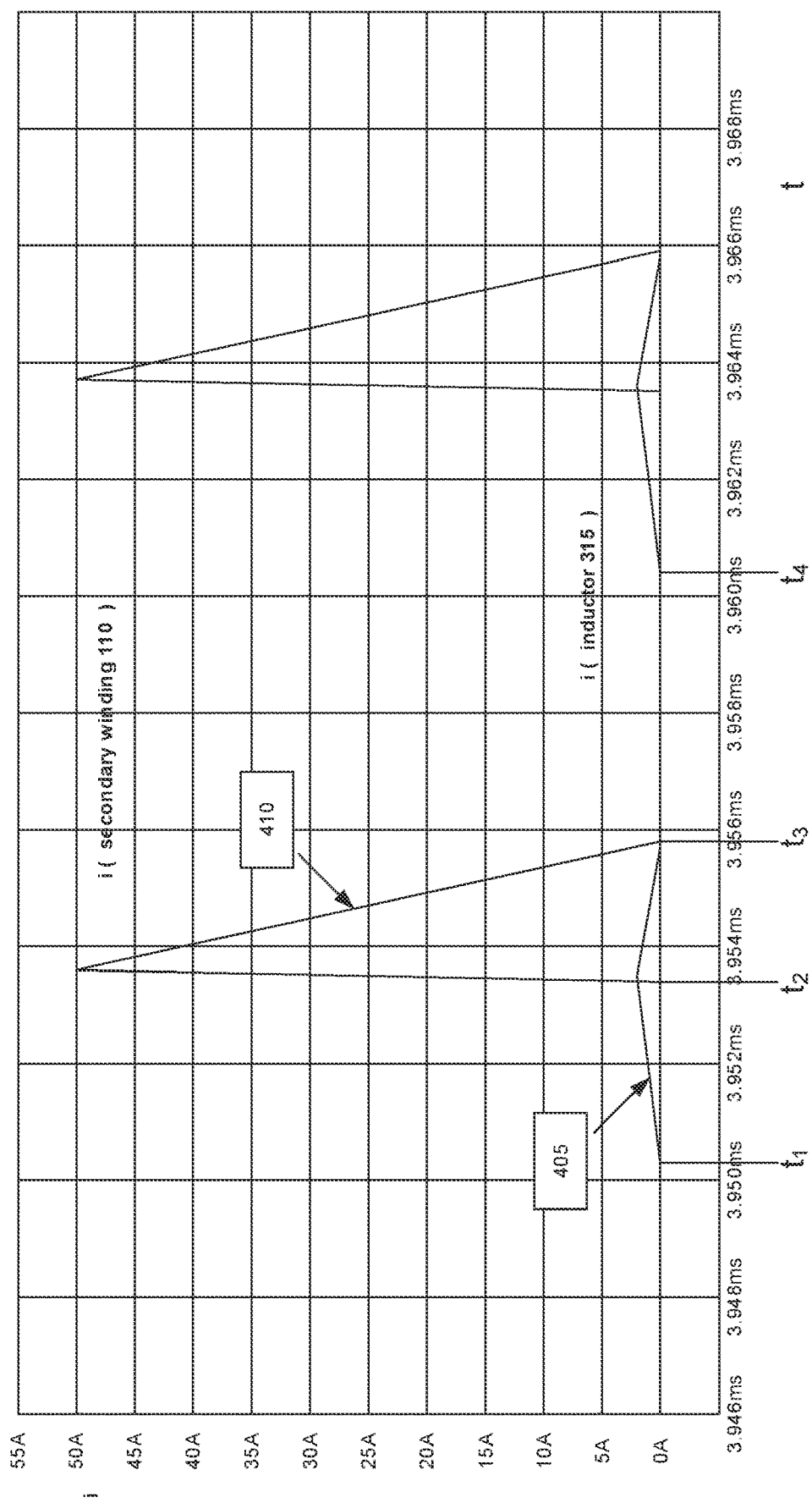
FIG. 4 is a graph depicting selected currents during two switching events of the voltage regulator of FIG. 3.

Turning now to FIG. 4, the figure shows a graph depicting selected currents during two switching events of the voltage regulator of FIG. 3. A first waveform 405 in the graph depicts current versus time for the inductor 315. A second waveform 410 in the graph depicts current versus time for the secondary winding 110. As can be seen from the graph, the voltage regulator 300 is operating in DCM. MOSFET 130 is switched on, at time t1, at which time current starts to increase through MOSFET 130 and current starts to increase through inductor 315. The on-time state starts at t1 and ends at t2. At time t2, MOSFET 130 is turned off. Once MOSFET 130 is off, current starts to flow in the secondary winding 110, initially through MOSFET 205 body diode 210, and later through the source-to-drain path of MOSFET 205 and decreases till it reaches zero at t3. Also current through inductor 315 decreases till it reaches zero at t3. The synchronous controller 320 senses the sum of the voltage drop across the MOSFET 205 and the diode 310, and controls MOSFET 205 to turn off when the sensed voltage drop is zero. The current through secondary winding 110 and the current through inductor 315 reach zero at the same time, at time t3. Accordingly, the synchronous controller 320 senses the zero voltage at time t3—indicating zero current— and turns off the MOSFET 205. The cycle repeats upon the next turn-on of MOSFET 130, at time t4.

Embodiments of the present technology include, but are not restricted to, the following.

(1) A system for detecting current through a secondary winding of a switching voltage regulator without directly sensing the current through the secondary winding of the switching voltage regulator, the system including a diode; an inductor connected in series with the diode to form a current detection path, wherein the current detection path is connected in parallel with the secondary winding; a switching element (e.g., MOSFET 205) connected in series with the current detection path and the secondary winding; and a controller (e.g., synchronous controller 320) operable to sense a voltage drop between a first terminal (e.g., source terminal 215) of the switching element and a second terminal (e.g., cathode terminal 310*b*) of the diode, the voltage drop being indicative of the current through the secondary winding.

(2) The system according to (1), wherein the switching element is a metal-oxide-semiconductor field effect transistor (MOSFET).

(3) The system according to (2), wherein the controller is operable to sense a voltage drop from a source terminal of the MOSFET to a cathode terminal of the diode.

(4) The system according to (3), wherein the controller has a first sense terminal coupled to the source terminal of the MOSFET, a second sense terminal coupled to the cathode terminal of the diode, and a control terminal coupled to a gate terminal of the MOSFET.

(5) The system according to (4), wherein an anode terminal of the diode is coupled to a drain terminal of the MOSFET.

(6) The system according to (4), wherein the controller is operable to turn off the MOSFET by sending a turn-off control signal to the gate terminal of the MOSFET when the controller senses that the voltage drop is zero.

(7) The system according to (1), wherein the controller is operable to turn off the switching element when the controller senses that the voltage drop is zero.

(8) The system according to (1), wherein the controller is operable to turn on the switching element when the controller senses that the voltage drop exceeds a threshold value.

(9) The system according to (8), wherein the switching element is a metal-oxide-semiconductor field effect transistor (MOSFET), and the threshold value is substantially equal to a sum of a voltage drop across a body diode of the MOSFET and a voltage drop across the diode.

(10) The system according to (1), wherein the inductor has an inductance that is greater than the inductance of the secondary winding by a multiple in the range of 50 to 1000.

(11) A voltage regulator including a voltage source; a transformer having a primary winding and a secondary winding; a first switching element (e.g., MOSFET 130) connected in series with the voltage source and the primary winding; a diode; an inductor connected in series with the diode to form a current detection path, wherein the current detection path is connected in parallel with the secondary winding; a second switching element (e.g., MOSFET 205) connected in series with the current detection path and the secondary winding; and a controller (e.g., synchronous controller 320) operable to sense a voltage drop between a first terminal (e.g., source terminal 215) of the second switching element and a second terminal (e.g., cathode terminal 310*b*) of the diode, the voltage drop being indicative of the current through the secondary winding.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A system for detecting current through a secondary winding of a switching voltage regulator without directly sensing the current through the secondary winding of the switching voltage regulator, the system comprising:
a diode;
an inductor connected in series with the diode to form a current detection path, wherein the current detection path is connected in parallel with the secondary winding;
a switching element connected in series with the current detection path and the secondary winding; and
a controller operable to sense a voltage drop between a first terminal of the switching element and a cathode terminal of the diode, the voltage drop comprising a switching element voltage drop between the first terminal of the switching element and a second terminal of the switching element and a diode voltage drop between an anode terminal of the diode and the cathode terminal of the diode, and the voltage drop being indicative of the current through the secondary winding.

2. The system according to claim 1, wherein the switching element is a metal-oxide-semiconductor field effect transistor (MOSFET).

3. The system according to claim 2, wherein the controller is operable to sense a voltage drop from a source terminal of the MOSFET to a cathode terminal of the diode.

4. The system according to claim 3, wherein the controller has a first sense terminal coupled to the source terminal of the MOSFET, a second sense terminal coupled to the cathode terminal of the diode, and a control terminal coupled to a gate terminal of the MOSFET.

5. The system according to claim 4, wherein the anode terminal of the diode is coupled to a drain terminal of the MOSFET.

6. The system according to claim 4, wherein the controller is operable to turn off the MOSFET by sending a turn-off control signal to the gate terminal of the MOSFET when the controller senses that the voltage drop is zero.

7. The system according to claim 1, wherein the controller is operable to turn off the switching element when the controller senses that the voltage drop is zero.

8. The system according to claim 1, wherein the controller is operable to turn on the switching element when the controller senses that the voltage drop exceeds a threshold value.

9. The system according to claim 8, wherein the switching element is a metal-oxide-semiconductor field effect transistor (MOSFET), and the threshold value is substantially equal to a sum of a voltage drop across a body diode of the MOSFET and a voltage drop across the diode.

10. The system according to claim 1, wherein the inductor has an inductance that is greater than the inductance of the secondary winding by a multiple in a range of 50 to 1000.

11. A voltage regulator comprising:
a voltage source;
a transformer having a primary winding and a secondary winding;
a first switching element connected in series with the voltage source and the primary winding;
a diode;
an inductor connected in series with the diode to form a current detection path, wherein the current detection path is connected in parallel with the secondary winding;
a second switching element connected in series with the current detection path and the secondary winding; and
a controller operable to sense a voltage drop between a first terminal of the second switching element and a cathode terminal of the diode, the voltage drop comprising a switching element voltage drop between the first terminal of the switching element and a second terminal of the switching element and a diode voltage drop between an anode terminal of the diode and the cathode terminal of the diode, and the voltage drop being indicative of the current through the secondary winding.

\* \* \* \* \*